United States Patent [19]
Wilson et al.

[11] Patent Number: 6,047,282
[45] Date of Patent: *Apr. 4, 2000

[54] APPARATUS AND METHOD FOR EXPANDABLE BIOMETRIC SEARCHING

[75] Inventors: Steven D. Wilson; Amirali Virani, both of Chicago; Orlin Momchev, Elk Grove Village, all of Ill.; Dale R. Setlak, Melbourne, Fla.

[73] Assignee: AuthenTec, Inc., Melbourne, Fla.

[ * ] Notice: This patent is subject to a terminal disclaimer.

[21] Appl. No.: 08/986,162

[22] Filed: Dec. 5, 1997

[51] Int. Cl.$^7$ .................................................. G06F 17/30
[52] U.S. Cl. .................................................. 707/3; 707/6
[58] Field of Search .................................. 707/3, 4, 5, 6, 707/1, 7, 9, 10, 101, 104, 102; 382/124, 125–127, 116, 115; 235/380, 382

[56] References Cited

U.S. PATENT DOCUMENTS

| | | | |
|---|---|---|---|
| 5,745,900 | 4/1998 | Burrows | 707/102 |
| 5,825,871 | 10/1998 | Mark | 379/355 |
| 5,841,888 | 11/1998 | Setlak et al. | 382/124 |
| 5,845,005 | 12/1998 | Setlak et al. | 382/124 |
| 5,869,822 | 2/1999 | Meadows, II et al. | 235/380 |
| 5,930,804 | 7/1999 | Yu et al. | 707/104 |

OTHER PUBLICATIONS

Halici et al., Fingerprint classification through self–organizing feature maps modified to treat uncertainties, Proceedings IEEE, pp. 1497–1512, Oct. 1996.

Ratha et al., A real–time matching system for large fingerprint databases, IEEE transactions on pattern analysis and Machine intelligence, pp. 799–813, Aug. 1996.

Wang et al., Fast retrieval of electronic documents in digital libraries, Seventh international conference on tools with AI, pp. 208–215, Nov. 1995.

Germain et al., Fingerprint matching using transformation parameter clustering, IEEE computational science and engineering, pp. 42–49, Dec. 1997.

Wagner et al., The fingerprint database, Sixth International conference on Data Engineering, pp. 330–336, Feb. 1990.

*Primary Examiner*—Anton W. Fetting
*Assistant Examiner*—Sanjiv Shah
*Attorney, Agent, or Firm*—Allen, Dyer, Doppelt, Milbrath & Gilchrist, P.A.

[57] ABSTRACT

A method and apparatus for expandable biometric searching are provided. The apparatus preferably includes a database having a plurality of biometric data groups. Each of the plurality of biometric data groups includes a plurality of biometric records stored therein, and each of the biometric records includes at least one biometric index and biometric data associated with the at least one biometric index. The apparatus also includes a plurality of biometric searching engines. Each of the plurality of biometric searching engines preferably include a data group manager connected to the plurality of biometric data groups for managing the plurality of data groups. The data group manager includes multi-dimensional search space constructing means for constructing a multi-dimensional search space and internal map constructing means for constructing internal maps for each data group being managed. A method of expandably storing and searching biometric data preferably includes assigning each of a plurality of data groups to a plurality of biometric searching engines for performing a search of biometric data from the plurality of biometric data groups so that each of the plurality of biometric data groups is assigned only one of the plurality of biometric searching engines and controlling the plurality of data groups so as to construct a multi-dimensional search space and to construct internal maps for each data group being controlled.

77 Claims, 8 Drawing Sheets

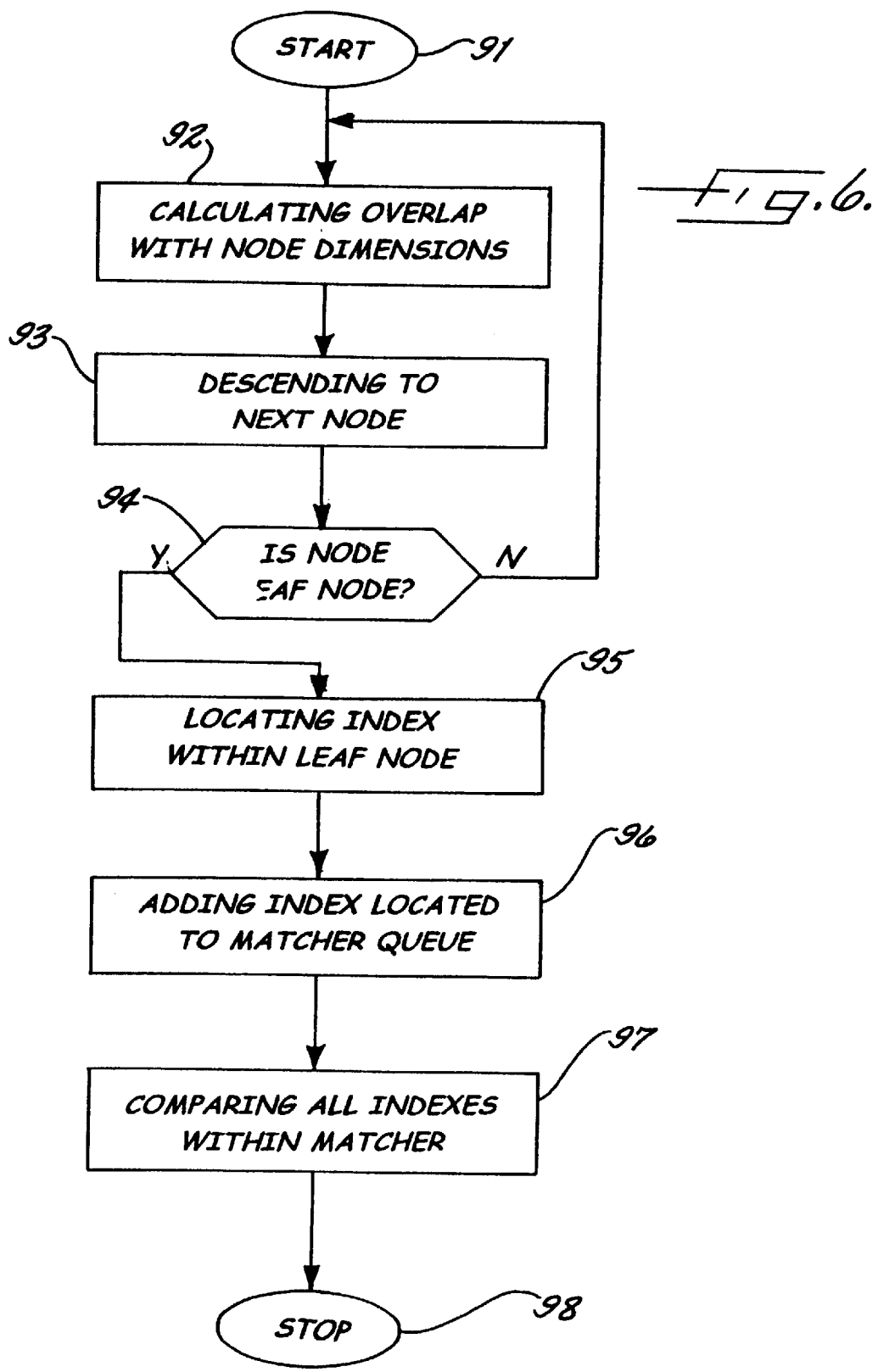

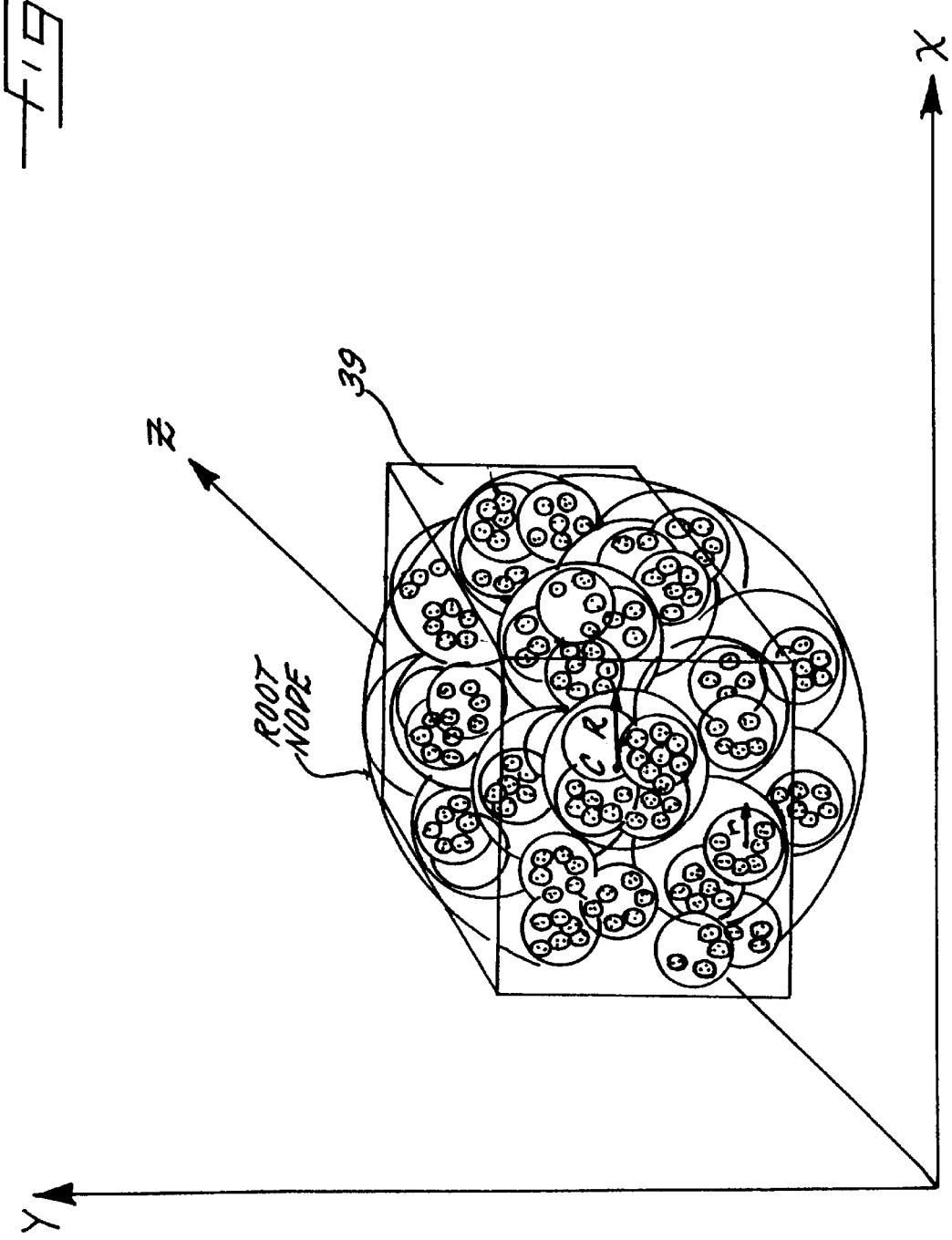

APPARATUS AND METHOD FOR EXPANDABLE BIOMETRIC SEARCHING

FIELD OF THE INVENTION

The invention relates to the field of data processing, and, more particularly, to the field of efficiently searching for biometric data in a relatively large database of biometric data.

BACKGROUND OF THE INVENTION

Biometric matching is a reliable and widely used technique for personal identification or verification. As understood by those skilled in the art, biometrics is the statistical study of biological data such as retina or iris patterns, fingerprint patterns, facial shape or patterns, cornea patterns, hand geometry, or voice patterns. The use of biometric data can be an effective way to prevent unauthorized use of information resources, equipment, confidential data, vehicles, identification cards, credit/debit cards, and other items or data desired to be protected.

For example, a common approach to fingerprint identification involves scanning a sample fingerprint or an image thereof, converting it into electrical signals, and storing the image and/or unique characteristics of the fingerprint image. The characteristics of a sample fingerprint may be compared to information for reference fingerprints already in storage to determine identification or for verification purposes.

Even though advancements in the use of fingerprint data have been made over the years, comparing a sample fingerprint to a large number of reference fingerprints may be prohibitively expensive and/or simply take too long. Accordingly, fingerprints are typically classified into a plurality of discrete sets and/or subsets in the form of a hierarchical tree to thereby expedite searching. A common top level classification for fingerprints, for example, usually differentiates the prints into the classes of: plain whorl, plain loop, tented arch, etc. based upon broad ridge pattern types. These classes may be yet further divided into subclasses. Accordingly, a fingerprint sample to be searched, once itself is classified, can be more efficiently compared to only those prints in the respective classes and subclasses of the search tree. For example, U.S. Pat. No. 5,465,303 to Levison et al. describes both the widely used Henry classification system and the Vucetich classification system.

The conventional classification approaches may result in binning of fingerprint types or classifications, wherein a single bin is searched for the matching print. Nevertheless, the bins may still be relatively large thus resulting in lengthy and expensive searching. Moreover, a print is considered either in one bin or another and there is no consideration given to any uncertainty in whether the print is in one bin or another. In other words, there is typically no relation between adjacent bins that would assist in searching. Any degradation in the print quality may also result in it being simply in the wrong bin and thus unmatchable.

Fingerprint minutiae, the branches or bifurcations and end points of the fingerprint ridges, are often used to determine a match between a sample print and a reference print database. For example, U.S. Pat. Nos. 3,859,633 and 3,893, 080 both to Ho et al. are directed to fingerprint identification based upon fingerprint minutiae matching.

U.S. Pat. No. 3,959,884 to Jordan et al. discloses a method of classifying fingerprints by converting a fingerprint to a pattern of binary values which define a spatial array of ridges and valleys. A part of the pattern is selected for transformation by a repeatable criteria, such as a circular area having its center at the average center of curvature of the circular ridges of the upper part of the print. The data represented by the selected part is transformed into a plot of a relative position/intensity surface with a predetermined set of first and second coordinates and a variable third coordinate having a value dependent upon the frequency of occurrence of ridges when the origin of the first and second coordinates is taken at multiple positions over the selected area. The surface is divided into multiple areas, the number of areas being equal to the desired number of code elements in a descriptor code to be constructed. The curvature of the surface within each area is preferably quantized to produce the number of code elements. Finally, a descriptor code is constructed by concatenating the code elements in a predetermined order.

Yet another approach to fingerprint matching attempts to assign a unique digital code to each fingerprint. For example, U.S. Pat. No. 4,747,147 to Sparrow discloses a fingerprint scanning system and method for rotating a scan line about a central point on the fingerprint. A code representing the types of irregularities is recorded, along with a ridge count so that coordinates give a complete topological and spatial description of a fingerprint for computer processing.

Other approaches are also known for attempting to efficiently and accurately find a match between a sample fingerprint and a database of reference prints. For example, U.S. Pat. No. 5,239,590 to Yamamoto discloses a fingerprint image processing method wherein a master and a sample fingerprint image are divided into a plurality of blocks and each block is divided into a plurality of block areas, in turn, having a plurality of pixels with an associated direction. The direction of each pixel is determined based on pixel density partial differentials between the pixel and adjacent pixels for a plurality of directions. A match is determined based upon specific dispersion, mean, and cross-correlation calculations.

Despite the proliferation of and attempted advancements in fingerprint and other biometric data classifications and searching systems and methods, storing, searching, and processing biometric data, especially for large databases, remains cumbersome and time consuming. Additionally, many of these known systems are limited to only one user performing the searching capabilities at a designated searching terminal. Accordingly, there still exists a need for reliable, efficient, and readily expandable automated biometric data storage, searching, and matching.

SUMMARY OF THE INVENTION

In view of the foregoing background, the present invention advantageously provides a method and apparatus for readily expandable storing, searching, and matching of biometric data. The present invention also advantageously provides a method and apparatus for simplifying the starting and the scaling of search engines or computer systems and the restoring of failed search engines or computer systems. The present invention additionally advantageously provides increased performance capabilities, e.g., speed of data searching and processing, and increased accuracy.

More particularly, according to the present invention, an apparatus for expandable biometric searching preferably includes a database having a plurality of biometric data groups. Each of the plurality of biometric data groups includes a plurality of biometric records stored therein, and each of the biometric records includes at least one biometric index and biometric data associated with the at least one biometric index. The apparatus also includes a plurality of biometric searching engines. Each of the plurality of biometric searching engines preferably includes a data group manager connected to the plurality of biometric data groups for managing the plurality of data groups. The data group manager preferably includes multi-dimensional search space constructing means for constructing a multi-dimensional search space and internal map constructing means for constructing internal maps for each data group being managed.

The data structure of the multi-dimensional search space of the apparatus, for example, is preferably a spherical or hyper-spherical data structure which defines a search space by a plurality of these spheres arranged in nodes or nodal regions of a tree. The search space is preferably a multi-dimensional space wherein this data structure can advantageously be used to readily add or insert additional records as a database is expanded. These multiple dimensions also increase the capabilities of the apparatus for efficient storing, inserting, deleting, and searching of biometric records.

According to another aspect of an apparatus for expandable biometric searching according to the present invention, the apparatus preferably further includes at least one client computer having biometric recording means associated therewith for recording at least one biometric record. The at least one biometric record includes at least one biometric index and biometric data associated with the at least one biometric index. A data communications network is preferably connected to the client computer, and at least one server computer is preferably connected to the data communications network. The server computer preferably includes a database having the plurality of biometric data groups each of which includes the plurality of biometric records stored therein. Each of the biometric records stored in the server computer includes at least one biometric index and biometric data associated with the at least one biometric index. The server computer also preferably includes the plurality of biometric searching engines which have the data group managing means that construct a multi-dimensional search space and internal maps for each data group being managed. The plurality of searching engines preferably also include selecting means for selecting from the multi-dimensional search space at least one biometric record and matching means responsive to the selecting means for matching a biometric from the at least one biometric record to a biometric being searched.

Methods of expandably storing and searching biometric data are also provided according to the present invention. A method preferably includes assigning each of a plurality of data groups to a plurality of biometric searching engines for performing a search of biometric data from the plurality of biometric data groups so that each of the plurality of biometric data groups is assigned only one of the plurality of biometric searching engines and controlling the plurality of data groups so as to construct a multi-dimensional search space and to construct internal maps for each data group being controlled.

Another method of expandably storing and searching biometric data preferably includes providing a plurality of biometric data groups. Each of the plurality of biometric data groups have a plurality of biometric records stored therein. Each of the plurality of biometric records includes at least one biometric index and biometric data associated with the at least one biometric index. The method also includes assigning each of the plurality of data groups to a plurality of biometric searching engines for performing a search of biometric data from the plurality of separate biometric data groups so that each of the plurality of biometric data groups is assigned only one of the plurality of biometric searching engines and controlling the plurality of data groups so as to construct a multi-dimensional search space and to construct internal maps for each data group being controlled.

Yet still another method of expandably storing and searching biometric data according to the present invention preferably includes assigning a plurality of indexes to a biometric feature, assigning the plurality of indexes to a database, and simultaneously searching the plurality of indexes to locate the biometric feature. The step of assigning the plurality of indexes to a database also preferably includes the step of assigning at least one of the plurality of indexes to one of a plurality of data groups of the data base. Each of the plurality of data groups preferably has a full range of the indexes and also preferably has the plurality of biometric records as described above uniformly or generally evenly distributed across the data groups.

Because the biometric records are assigned to and stored in data groups according to this method of the present invention, parallel search processing, for example, can be significantly faster than other searching configurations or systems. By increased speed and reliability, the costs for a biometric searching apparatus can be kept relatively low. Also, because the apparatus and methods are scalable, the apparatus and method, for example, provides the capability of quickly searching 300; 300,000; or 3,000,000 matches a second. In other words, because the apparatus is preferably arranged in a distributed client-server environment, the process capacity of the apparatus can be increased by the dynamic addition of more hardware, more processors, more computers, or more memory so that the apparatus and method provide the capability of searching any size database quickly.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 6 is a schematic flow diagram of a method of searching biometric data in an apparatus for expandable biometric searching according to the present invention; and FIG. 7 is a graphical diagram of a multi-dimensional search space of a searching engine of an apparatus for expandable biometric searching according to the present invention.

DETAILED DESCRIPTION OF A PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
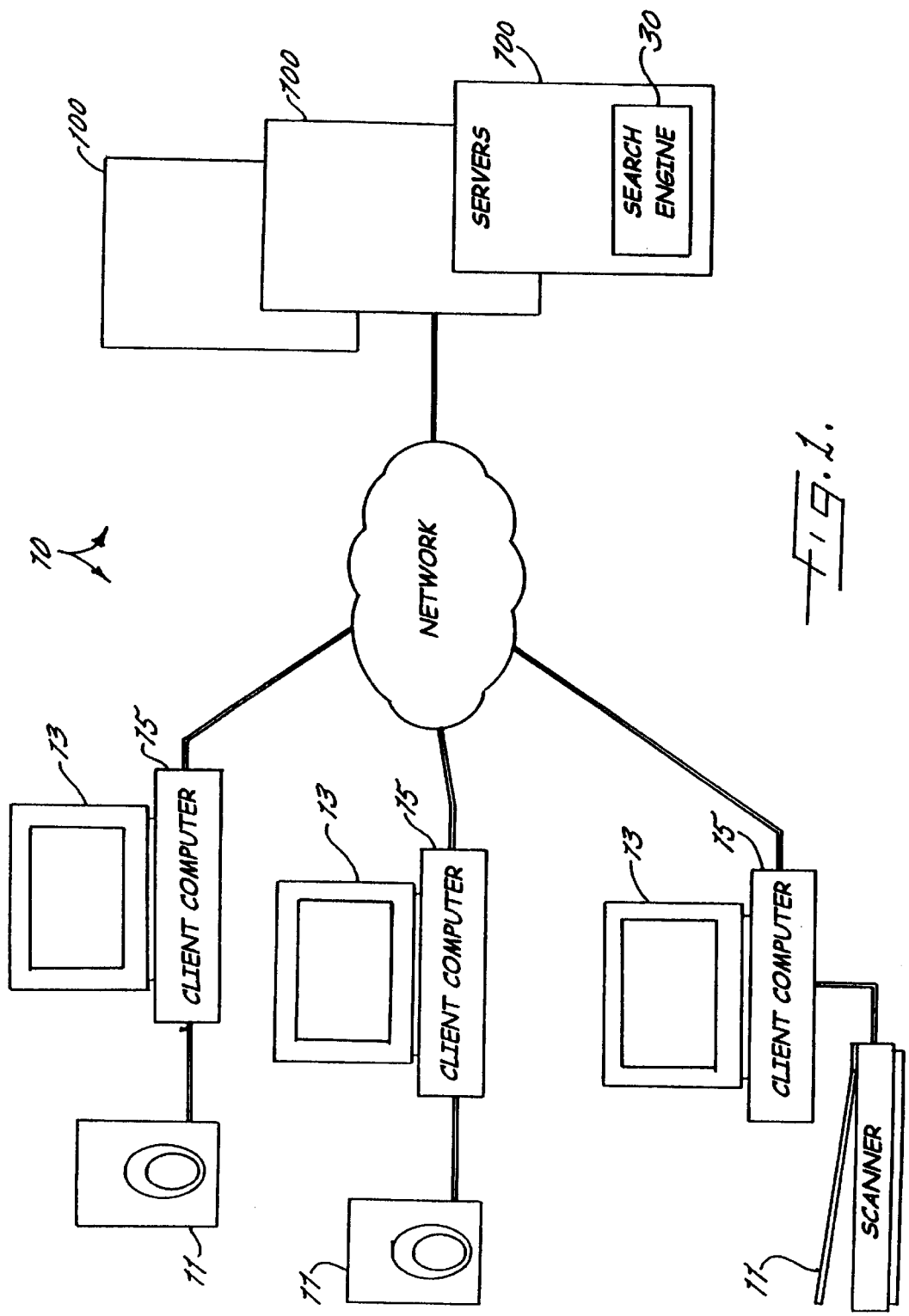
FIG. 1 is a schematic view of an apparatus for expandable biometric searching according to the present invention.
Figure 2:
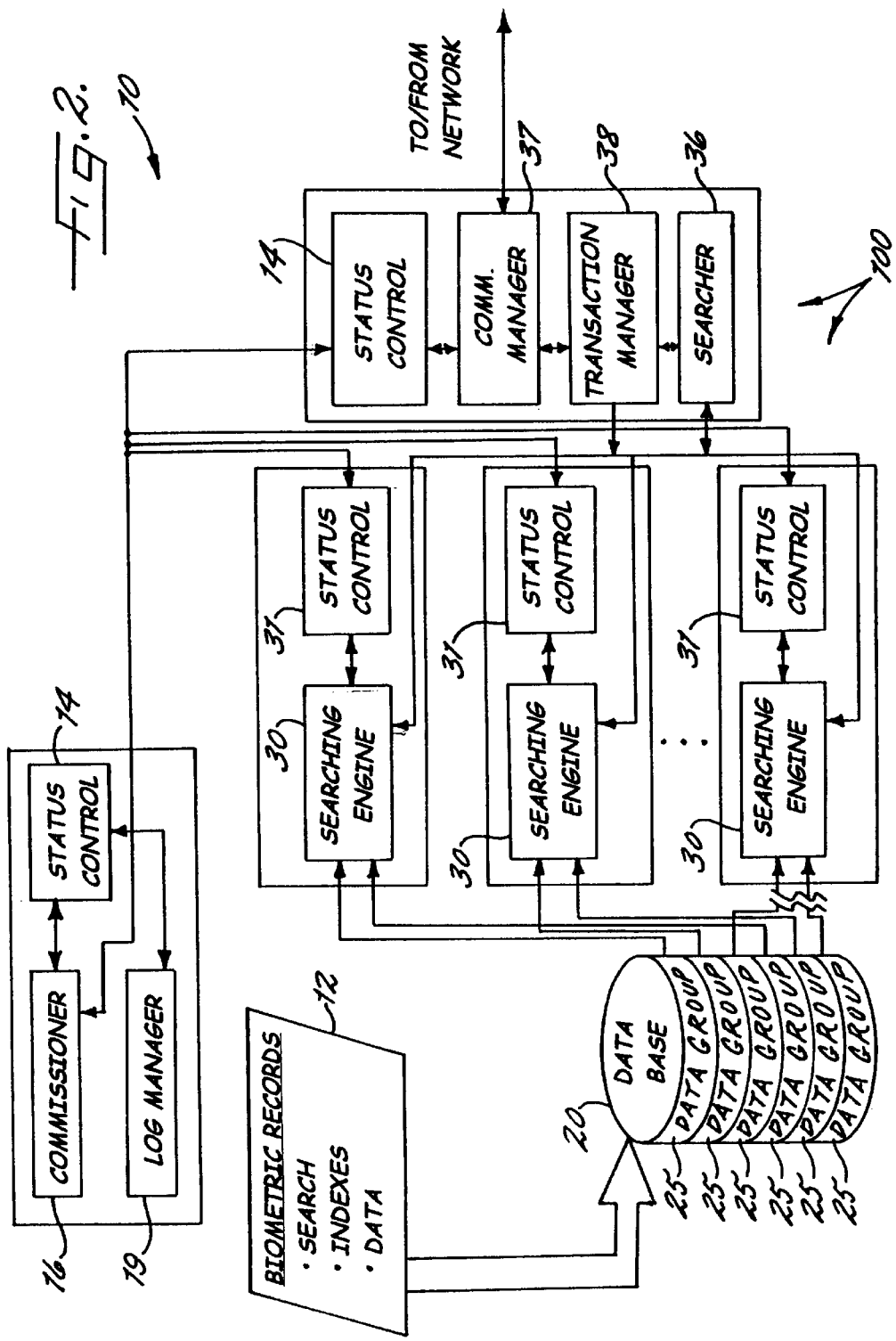
FIG. 2 is a schematic block diagram of an apparatus for expandable biometric searching according to the present invention.
Figure 3:
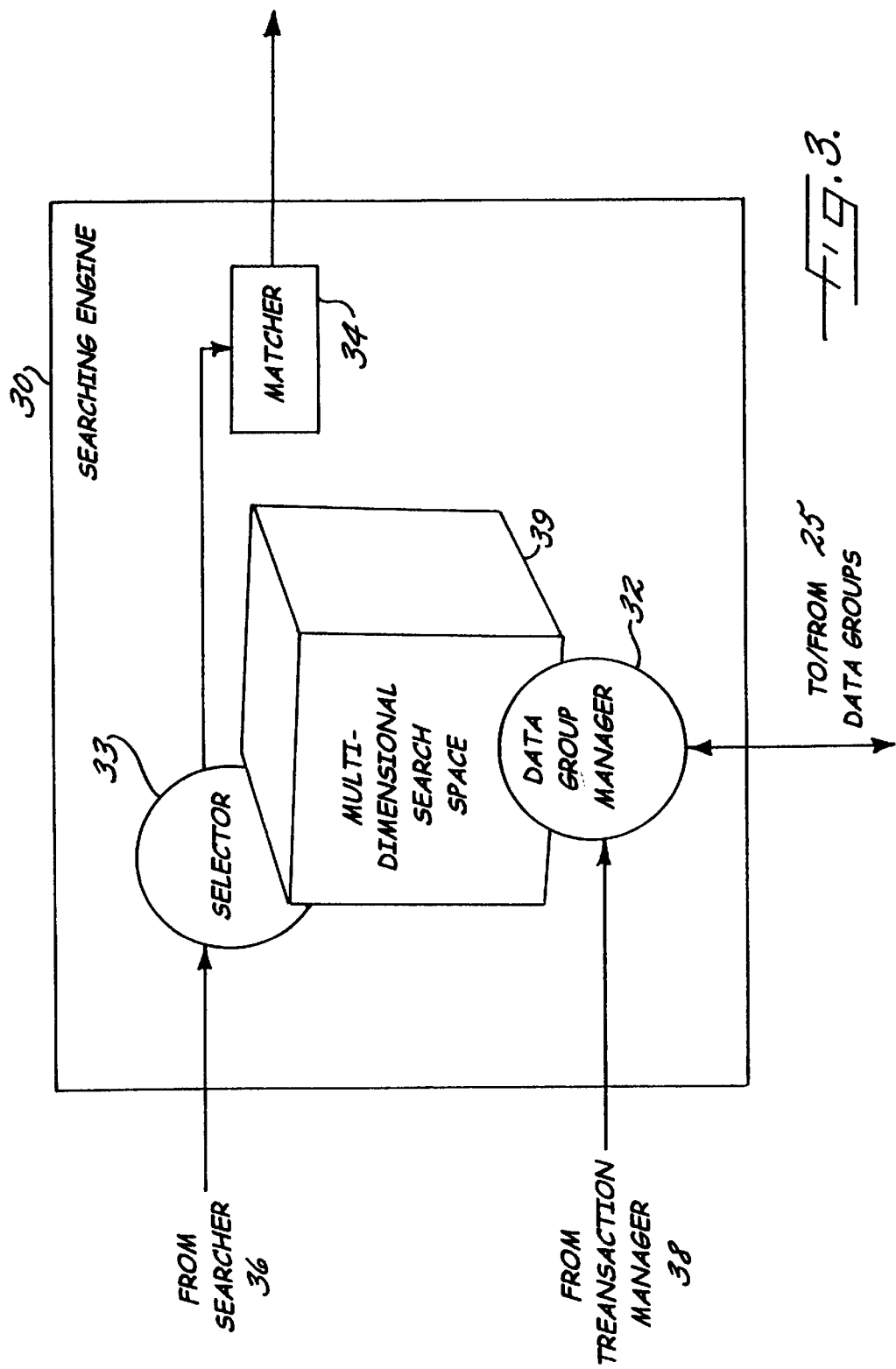
FIG. 3 is a schematic block diagram of a searching engine of an apparatus for expandable biometric searching according to the present invention.

FIGS. 1–3 schematically illustrate an apparatus 10 for expandable biometric searching of biometric data. The apparatus 10, for example, can be a plurality of data communication terminals, computers, or other computer systems interconnected or networked together such as in an office, industrial, or remote network environments and software associated therewith. As understood by those skilled in the art, the apparatus 10 is preferably arranged in a client computer 15 and server 100 distributed process architecture, design, or configuration in a network or network data communications link so that one or more personal computers or other computer related systems, e.g., printer, scanners, modems, or copiers, can readily be added to the searching network. The apparatus 10 is preferably highly modular and distributed so that the processing power of a plurality of personal computers or other components are combined into one much more powerful system.

The apparatus 10 preferably includes at least one database 20, and can also include a plurality of biometric databases 20, e.g., positioned in remote locations, that appear or interact as one database 20. Each of the plurality of biometric databases 20 is preferably subdivided or includes a plurality of biometric data groups 25. All of the biometric data is preferably spread among the participating computers and resides in the memory of the computers. A data group 25 is a subset of the database 20, and for a large database 20, the apparatus 10 preferably has at least 100 data groups 25 in the database 20. Each data group 25, for example, may be no more than 1% of the entire database 20. Also, only a small percentage of the data groups 25 are spread over each of a plurality of searching engines 30 for a more even loading or distribution.

As illustrated in FIG. 2, and as generally understood as being the server side 100 of the network, each of the plurality of biometric data groups 25 also includes a plurality of biometric records 12 each having at least one subject identifier, such as social security number, driver's license number, or other system assigned unique number, at least one biometric index, and biometric data. Each data group also preferably has a full range of biometric indexes. The full range is at least 90% of the full range of indexes or index values and, more preferably, at least 99% of the full range of indexes. The biometric data, for example, can be fingerprints or other biometric data that is scanned into a database 20 by a biometric scanner 11 which is preferably positioned at the client 15 in the network.

The fingerprint or other human feature is extracted or captured and processed for later finding and matching. Each of the plurality of biometric data groups 25 is preferably uncorrelated to the biometric indexes. The extracted data or information is submitted to the server 100 in the network of the apparatus 10 for identification or authentication processing. The index or indexes for a fingerprint, for example, can be minutiae count or average ridge pitch as understood by those skilled in the art. Curliness, however, is preferably the index for a fingerprint as described in co-pending U.S. patent application Ser. No. 08/589,064, filed on Jan. 23, 1996 assigned to the same assignee as the present application and which is hereby incorporated herein by reference in its entirety.

The apparatus 10 preferably also includes an application process controller, e.g., preferably provided by a commissioner 16, that is a process running on a computer with access to an engine system/application configuration file for controlling at least one selected application process. The commissioner 16 has an address and port known to all status controllers 14, 31 or deputies of the apparatus 10. The commissioner 16 is responsible for checking every status controller's version and distributing the configuration for the computer where the status controller 14, 31 is running. Before starting, the commissioner 16 makes sure that all of the data groups 25 are accounted for and at least one communications manager 37, at least one transaction manager 38, at least one searcher 36, and at least one combination of a data group manager, a selector, and a matcher are configured and running for the apparatus 10.

Each computer or other computer system in the network preferably also has a status controller 14, 31 or deputy which sends a logon message to the commissioner 16 and verifies the software/product version with the commissioner 16. If the status controller 14, 31 cannot find a commissioner 16, then it will sleep until the status controller 14, 31 receives a logon request from a commissioner 16. The status controller 14, 31 will also receive system/application configuration parameters for the local computer from the commissioner 16 after log-on procedures are completed. The status controller 14, 31 also preferably monitors all of the services running under its control and, in case of failure, alerts the commissioner 16.

Additionally, the apparatus 10 preferably includes a log manager 19 which will write all messages to a log database associated therewith via an input/output layer. The apparatus 10 preferably captures and records event messages and alert messages from all application tasks, e.g., by modem. When receiving an alert message, the log manager 19 will also send an alert message to notify support staff of an alert event. The log manager 19 preferably has the ability to record and view the system state which includes critical and non-critical errors, performance measures, and debugging messages.

As perhaps best illustrated in FIGS. 2–3, the apparatus 10 also includes a plurality of biometric searching engines 30 preferably on the server side of the network. Each of the plurality of biometric data groups 25 is preferably assigned to and connected to only one of the plurality of biometric searching engines 30 as illustrated. As illustrated, however, each searching engine 30 can be assigned and connected to more than one of the plurality of data groups 25. The biometric searching engines 30 are preferably provided by software program associated with an operating system of a computer and communicating through a network server 100, or other computer related system. The searching engine 30, for example, is preferably connected to or in communication with communications controlling means, e.g., provided by a communications manager 37, for controlling communications with other system elements to handle requests, authenticate users, and accept/reject requests to be serviced by the server 100. Transaction scheduling means, e.g., provided by a transaction manager 38, is also provided which receives requests from the communications manager 37 and queues them into a transaction queue. The transactions are preferably processed based upon priority and then translated to simple commands to the searcher 36 and/or a data group manager 32 of each of the searching engines 30.

Each of the searching engines 30 also preferably includes the data group manager 32 which is preferably connected to or in communication with the plurality of data groups 25 for managing the plurality of data groups 25. The data group manager 32 preferably shares a process space with selecting means, e.g., provided by a selector 33, for selecting from a multi-dimensional search space at least one biometric record and matching means, e.g., provided by one or more matchers 34, responsive to the selecting means for matching a biometric the at least one biometric record to a biometric being searched. It will be understood by those skilled in the art that the selector 33 and the matcher 34 have the capability for selecting and matching biometric data, but for a given search the results can be that no biometric data was selected or that no matches exist.

The data group manager 32 also preferably includes means, e.g., preferably provided by a software program, for building or constructing the search space when the system starts up. The data group manager 32 also includes means, e.g., a software program, for building or constructing the internal mappings for each data group that it manages (see also FIG. 7).

The data group manager 32 can advantageously initiate searching in single or multi-dimensional space for multi-dimensional biometric data searching capabilities, e.g., more than one index per fingerprint or other biometric data, more than one fingerprint or multiple fingers for the same individual, different types of biometric data such as fingerprint, facial shape, hand geometry, iris, retina, and/or voice. The multiple dimensional searching capabilities, for example, amplifies the efficiency of the searching engine 30 and the apparatus 10 itself. Accordingly, indexes can be used for all ten fingers of an individual to narrow a search and match on one or two features or characteristics. The multiple dimension capabilities are for at least two dimension, but preferably for at least about 20 or more dimensions to provide all of the capabilities of the present invention, e.g., to efficiently index, store, insert, delete, and search hundreds of thousands or millions of records.

As perhaps best illustrated in FIG. 7, the data structure of the multi-dimensional search space 39 of the apparatus 10, for example, is preferably a spherical or hyper-spherical data structure which defines a search space by a plurality of these spheres arranged in nodes or nodal regions of a tree, and preferably a balanced tree. Spheres or hyper-spheres are the preferable shape because of the ease to define and the simplicity to handle and illustrate. It will be understood by those skilled in the art, however, that other shapes such as ellipsoidal or hyper-ellipsoidal or arbitrary shapes which have the same benefits and distinctions of the present invention can be used as well. The shape of the object, however, is preferably representable by the use of numbers. The search space 39 is preferably a multi-dimensional space wherein this data structure can advantageously be used to readily add or insert additional records as a database 20 is expanded, e.g., by the addition of more data groups 25. These multiple dimensions also increase the capabilities of the apparatus 10 for efficient storing, inserting, deleting, and searching of biometric records.

The searching engine 30 can also include a selector 33 for selecting or locating data searched among the data groups 25 and a matcher 34 connected to or in communication with the selector 33 for matching a selected or located set of biometric data. The selector 33 receives search requests from the searcher 36. After receiving a search request, the selector 33 uses the search space built by the data group manager 32 to select a group of subject records for matching. The configuration parameters for the selector 33, for example, can be biometrics to use, indexes for each selected biometric, a range between the minimum and maximum possible values, principal components and the associated functions, cell size for each selected index, and a measure of variance for each selected index of each selected biometric. The matcher 34 pulls records from the queue of selected records and calls the appropriate matching function, as understood by those skilled in the art, to match certain biometrics from that record with a search biometric. The matcher 33 can also include a mask for indicating the decision logic when flagging a record as a potential match.

The searching in a multi-dimensional searching space 39 such as illustrated in FIGS. 3 and 7 is preferably conducted from a starting index outward to increase the speed and accuracy in locating the desired results. The searching engine 30 of the apparatus 10 can also use other pseudo-biometric indices, such as age, sex, date of birth, color of eyes, or height, to further reduce the number of matches in a set or subset and preferably has multithreaded processing capabilities as understood by those skilled in the art. When a new or additional record is added to the search space 39, all of the index values are checked to determine if the new entry is completely within the bounding hyper-sphere for a parent entry (see FIG. 7). If not, then all of the boundary hyper-spheres up to the root node are readjusted to include the new entry.

The biometric data as described herein is preferably fingerprint data. An example of how this fingerprint data can be gathered, recorded, formed, and stored can be seen in co-pending U.S. patent application Ser. Nos. 08/590,564, U.S. Pat. No. 5,956,415 08/592,469, U.S. Pat. No. 5,657,774 08/592,472 U.S. Pat. No. 5,956,415 and 08/671,430 U.S. Pat. No. 5,862,248 assigned to the same assignee and which are incorporated herein by reference in their entireties. As understood by those skilled in the art, however, other biometric data, such as retina, iris, voice, skin, pores, and the like, can be used as well according to the present invention. The use of fingerprint or other biometric data can be an effective way to prevent unauthorized use of information resources, equipment, confidential data, vehicles, identification cards, credit/debit cards, and other items or data desired to be protected. These applications, for example, can include authenticating electronic financial transactions, driver licenses, insurance claims, program membership, personal e-mail, electronic medical orders, voter registration, prescriptions, certified data entry, and law enforcement.

According to other aspects of the present invention, the apparatus 10 can also advantageously include biometric record forming means 17 for forming a plurality of biometric records 12 (see FIGS. 1–2). The biometric record forming means is also preferably software and/or hardware which extracts, captures, and processes biometric data from the body of a human as understood by those skilled in the art, e.g., also can include some or all portions of the biometric scanner 11. The biometric record forming means 17 preferably includes index assigning means 18 for assigning the at least one biometric index to biometric data independent of the biometric data. In other words, the index values provide no indication of what the biometric data actually is. For input, output, or other purposes, the apparatus 10 can also preferably include a display 13, e.g., including a graphical user interface, or other computer systems interface or peripheral devices, e.g., printers, plotters, image processors, data collectors, keyboards, or data card readers.

Also, as set forth above, each of the biometric records 12 preferably include at least one biometric index, and preferably a plurality of biometric indexes, and biometric data associated with the at least one biometric index. Each of the plurality of indexes is preferably independent of the other ones of the plurality of indexes. The biometric data is preferably filed or stored by the indexes, and the indexes preferably have a known repeatability so that only a portion of data that is on a searching engine 30 needs to be searched to determined if desired matching biometric data, such as a fingerprint, is present. Preferably, the plurality of biometric indexes is generally uniformly or evenly distributed over the full range of biometric indexes. The biometric data preferably includes features of fingerprint data, and the biometric indexes each are preferably a numeric value.

For example, in prior systems each fingerprint is generally characterized by minutiae data and is classified in a series of classification bins. In contrast, the apparatus and method of the present invention can characterize each fingerprint by a plurality of indexes so that a single selection step of simultaneously searching the plurality of indexes dramatically reduces the processing time required by a central processing unit or other processor of a computer system.

Advantageously, the apparatus 10 preferably has the capabilities for readily expanding the searching capabilities by adding an additional biometric searching engine. To assist in accomplishing this desire, the apparatus 10 preferably includes reassigning means for reassigning data groups from each of the plurality of biometric data groups 25 to the additional biometric searching engine for performing a search of biometric data therefrom. The apparatus 10 also preferably includes reference scoring so that upon enrollment, biometric data from an individual is compared to other entries to improve accuracy and distribution of non-matching scores or data.

As illustrated and as understood by those skilled in the art, the apparatus 10 preferably includes parallel searching means, e.g., preferably provided by a plurality of processors or computers in parallel, for selectively searching the plurality of data groups 25 in parallel for biometric data. In other words, the biometric data is advantageously spread across multiple machines. The apparatus 10 also includes biometric record assigning means for hashing additional or new biometric records to one of the plurality of data groups 25. The records 12 and/or indexes of the data groups 25 of the database 20 are preferably generally evenly distributed or uniformly assigned across the data groups 20.

FIG. 5 advantageously illustrates a method for adding or inserting additional or new data into one of the data groups 25 of the apparatus 10. When a new biometric record is added to the apparatus 10, a numeric key is hashed to generate a data group identifier or I.D. This identifier is stored in the physical database in the entry for this record, and the record is added to the search space 39. Because database re-hashing can be expensive in terms of both time and computation, re-hashing an entire database 20 of the apparatus 10 is not preferable and is preferably a rare event. The apparatus 10, for example, can use the following process for hashing identifiers, i.e., hashing by division:

Let H be the hash function and k be the key of a subject record, then

H(k)=k Mod m where m is a prime number equal to the total number of data groups (data groups are rounded up to the nearest prime number).

The multi-dimensional search space 39 for the database 20 of the apparatus 10 preferably has a balanced tree configuration, e.g., generally defined by the virtual and multi-dimensional search space 39 having at least one root node or root nodal region and a plurality of leaf nodes or leaf nodal regions so that each of the plurality of leaf nodes are located on the same level of the tree of the search space 39, and is preferably a spherical or hyper-spherical data structure (see FIG. 7). In other words, the space is preferably divided into spheres or hyper-spheres and not rectangles or hyper-cubes as used in much of the prior art systems. The spheres or hyper-spheres can also vary in size even at the same node level.

Spherical shapes also advantageously provide lesser volume and lesser overlap than cubes or hyper-cubes. Because the apparatus 10 and the method of the present invention preferably is designed to minimize the overlap between branches or nodes, searching time can be substantially reduced and preferably minimized. The data structure of the present invention is also dynamic in that it can constantly be updated or revised without the requirement of having to reconfigure or recalculate the entire set or plurality of biometric records in the database 20.

The use of a spherical data structure for the virtual and multi-dimensional search space 39 preferably includes the calculations of a center point c and a radius r for each sphere so that boundaries, e.g., using the nodal radius R, can be defined for each node of the tree. The spherical data structure readily enables the variance of all data points or entries in a node to be calculated to determine the best split, and the dimension with the maximum variance can be chosen for the split. The split or division of a node, for example, can be caused by an overflow or additional data being added or inserted.

When a new record is inserted, for example, the minimum boundary region to hold all of the records within the node, e.g., actual records being illustrated by the dots or points in FIG. 7, can be calculated by calculating the mean for all of the center points and use this value as the center point C of the nodal or minimum boundary region ("MBR"). This center point can then be used to calculate or determine the distance from the center point to the center point of each entry. The radius of the MBR can be calculated by taking the maximum of the summation of this distance between the center point of the MBR and the center point of each entry plus the radius of each entry.

For inserting a new or an additional record (Block 61), the insertion level is preferably set to the leaf node (Block 61A), and preferably the root node is located or selected (Block 62). Next, a determination is made as to whether insert level is equal to the current level in the tree (Block 63). For an original insert, this determination should occur at a leaf node of the tree (Block 63). If the insert level is not equal to the current level, then an entry with an overlap is located (Block 64). If more than one overlap exists, then the maximum overlap is located, and the child thereof is followed to the next node (Block 65). Only if no overlap exists or occurs, then will the centroid or center point which is closest, e.g., based upon distance, be chosen. In other words, prior to inserting a new entry or record into the data structure of the space 39 nodal regions of the tree are followed along a data path having a maximum overlap of the additional or new biometric record with each of the entries within a level of the nodal regions. It will be understood by those skilled in the art that biometric records are only at leaf level nodes and that MBRs only are at internal levels above each leaf node of the tree.

If the insert level is equal to the current level, then the new entry is inserted (Block 66). A determination is then made as to whether the node is full (Block 67). If the node is not full, then the minimum boundary region is updated for all parent entries until arrival at the root node occurs (Block 68). The addition of the new entry is then complete (Block 69).

If the node is full, however, a determination is made as to whether this node is a root node (Block 71). If this is a root node, then the variance for all the entries in all the dimensions, e.g., 2, 3, 4, 20, or 120, in this node is calculated and the dimension of maximum variance is chosen (Block 72) where a split will then occur. The mean for these entries is then calculated (Block 73). Preferably, after the mean is calculated (Block 73), the entries in the node are then sorted in ascending order by value, in each entry, for the dimension with the maximum variance (Block 74). The entries in the node are then divided or split along the mean value which was previously calculated (Block 75), and a new node is created from the split (Block 76).

Preferably for this split, once this split line has been drawn based upon the mean, for example, then the minimum boundary region ("MBR") for each half or portion is calculated. The half or portion whose MBR is most distant from the parent entry preferably becomes the new node or that half or portion goes into the newly created node. The split entries are added to the new node (Block 77), and the minimum boundary region is updated for all parent entries until arrival at the root node occurs (Block 78). If the root node splits, then a new root node is created and the MBRs for the split nodes are added to the new root node. The split nodes then become the children of their respective MBR entries. The addition of the new entry is then completed (Block 79).

If the determination is made that the node is not a root node (Block 71), then a determination is made as to whether this is the first time at this node level (Block 81). If this is not the first time at this node level, then the process steps described in Blocks 72–79 as described above are performed. If this is the first time at the node, however, then a re-insertion process is initiated which preferably inserts entries at the same level as where taken from. To accomplish this a predetermined percentage, e.g., preferably less than 50% and even more preferably about 30–40%, of the entries that are most distant or farthest from the parent entry are separated (Block 82). A determination is then made as to whether all of the separated entries have been reinserted already (Block 83). In other words, is the process complete? If more separated entries need to be reentered, then the insert level is set to the current level in the tree (Block 84), and each separated entry returns to the process Block 62 as described above, and the process is performed again (Block 85). If no new separated entries need to be reinserted, then the process is complete (Block 86).

This insertion process, for example, advantageously provides a method which does not require an update count for each node, does not require the storing of a variance for each node, and does not require knowing or using the height of the tree or the total number of children in a node or a tree as a factor. Also, by choosing a shape or shapes of the virtual objects for the multi-dimensional searching space 39 which minimizes the overall overlap in the space and yet inserts new entries based upon locating children of nodes that have the maximum overlap searching time can be substantially reduced.

FIG. 6 illustrates an example of a searching method for an apparatus 10 of the present invention. The search process is started (Block 91) by scanning or retrieving biometric data to be searched. The spherical dimensions, e.g., a center and a radius, of the searched biometric index space are compared to the node, e.g., root node, to calculate any overlap (Block 92). An overlapping record is then followed through the child thereof to the next node (Block 93) to determine whether the next node is a leaf node (Block 94). If the node is a leaf node, then the spherical dimensions of the searched biometric index space is compared to the dimensions of each index in the leaf node to determined if each record is in the desired space or not. If not, the process above is repeated. If the next node is a leaf node and the index is located within the node (Block 95), the record is added to the matcher queue (Block 96), and the indexes and/or biometric data are compared in the matcher (Block 97), e.g., preferably within a 95% confidence level. The process can then be stopped (Block 98) or repeated for another record to be located.

Figure 4:
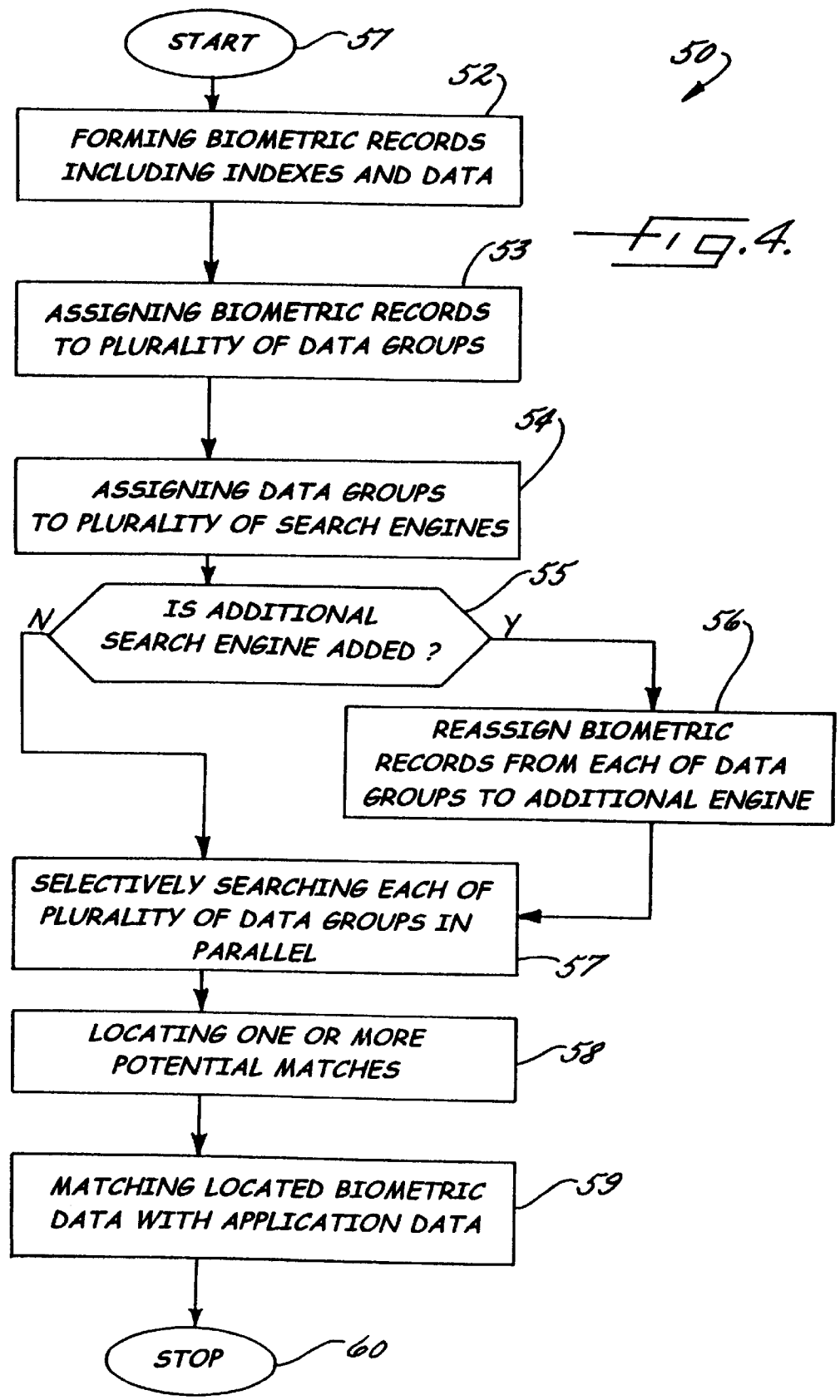
FIG. 4 is a schematic flow diagram of a method of storing and searching biometric data according to the present invention.

As illustrated in FIGS. 1–7, the present invention also includes methods of expandably storing and searching biometric data. As shown in FIG. 4, for example, a method 50 preferably includes forming (Block 52) a plurality of biometric records 12. Each of the biometric records 12 preferably includes at least one biometric index and biometric data associated with the at least one biometric index. The step of forming the biometric records 12 can include assigning the at least one biometric index to biometric data independent of the biometric data. The method also preferably includes assigning (Block 53) each of the plurality of biometric records 12 to one of the plurality of biometric data groups 25 so that each of the plurality of biometric data groups 25 includes a full range of biometric indexes and about the same number of biometric records. Each of the plurality of biometric data groups 25 is preferably uncorrelated to the biometric indexes. The method further includes assigning (Block 54) each of the plurality of biometric data groups 25 to a plurality of biometric searching engines 30 so that each of the plurality of biometric data groups 25 is assigned to only one of the plurality of biometric searching engines 30.

The method can also advantageously include adding (Block 55) an additional biometric searching engine 35 and reassigning (Block 56) biometric indexes from only one of the plurality of separate biometric data groups 25 to the additional biometric searching engine 35 for performing a search of biometric data therefrom. Each of the plurality of data groups 25 can be selectively searched in parallel (Block 57) for biometric data. Once the selective parallel searching is initiated, one or more potential matches of biometric data is located (Block 58), and the located biometric data is compared and/or matched to the desired application data (Block 59).

Another method of expandably storing and searching biometric data according to the present invention preferably includes assigning a plurality of biometric indexes to a plurality of biometric data groups 25 so that each of the plurality of biometric data groups includes a full range of biometric indexes and about the same number of biometric records. Each of the plurality of biometric data groups 25 is preferably uncorrelated to the biometric indexes. The method also preferably includes assigning each of the plurality of biometric data groups 25 to a plurality of biometric searching engines 30 so that each of the plurality of biometric data groups 25 is assigned to only one of the plurality of biometric searching engines 30.

Yet another method of expandably storing and searching biometric data preferably includes providing a plurality of biometric data groups 25. Each of the plurality of biometric data groups 25 has a plurality of biometric records 12 stored therein, and each of the plurality of biometric records 12 preferably includes at least one biometric index and biometric data associated with the at least one biometric index. Each of the plurality of biometric data groups 25 preferably has about the same full range of biometric indexes and about the same number of biometric records stored therein. The method also preferably includes assigning each of the plurality of separate data groups 25 to a plurality of biometric searching engines 30 for performing a search of biometric data from the plurality of separate biometric data groups 25 so that each of the plurality of biometric data groups 25 is assigned to only one of the plurality of biometric searching engines 30.

Yet still another method of expandably storing and searching biometric data according to the present invention preferably includes assigning a plurality of indexes to at least one biometric feature, assigning the plurality of indexes to a database, and simultaneously searching the plurality of indexes to locate the biometric feature. The step of assigning the plurality of indexes to a database 20 also preferably includes the step of assigning at least one of the plurality of indexes to one of a plurality of data groups 25 of the data base 20. Each of the plurality of data groups 25 as described above preferably has a full range of the indexes and also preferably has the plurality of indexes defining a plurality of biometric records which are uniformly or generally evenly distributed across the data groups.

The embodiment of the apparatus 10 and its associated methods can also be advantageously used for other applications as well. For example, another apparatus for expandable biometric searching having related structures is illustrated in the following co-pending patent applications: "Method And Apparatus For Expandable Biometric Searching," having attorney work docket number 17822, having U.S. Ser. No. 08/986,058 and "Method And Apparatus For Expandable Biometric Searching" having attorney work docket number 50001 having U.S. Ser. No. 08/986,094, both of which are assigned to the assignee of the present invention, and the entire disclosures of which are incorporated herein by reference in their entireties.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. An apparatus for expandable biometric searching, the apparatus comprising:
    a database having a plurality of biometric data groups, each of the plurality of biometric data groups including a plurality of biometric records stored therein, each of the biometric records including at least one biometric index and biometric data associated with the at least one biometric index; and
    a plurality of biometric searching engines, each of the plurality of biometric searching engines comprising data group managing means connected to said plurality of biometric data groups for managing the plurality of data groups, said data group managing means including multi-dimensional search space constructing means for constructing a multi-dimensional search space and internal map constructing means for constructing internal maps for each data group being managed.

2. An apparatus as defined in claim 1, wherein each of said plurality of searching engines further comprises selecting means for selecting from the multi-dimensional search space at least one biometric record and matching means responsive to said selecting means for matching a biometric from the at least one biometric record to a biometric being searched.

3. An apparatus as defined in claim 1, further comprising communications controlling means for controlling communications to and from the plurality of searching engines, transaction scheduling means responsive to said communications controlling means for scheduling priority of searching transactions by the plurality of searching engines, and searching means responsive to said transaction scheduling means for initiating search commands.

4. An apparatus as defined in claim 3, further comprising an application process controller in communication with each of the plurality of status controllers for controlling at least one selected application process.

5. An apparatus as defined in claim 4, further comprising logging means responsive to one of the plurality of status controllers for logging message data for selected applications.

6. An apparatus as defined in claim 1, further comprising a plurality of status controllers for controlling the status of the plurality of searching engines, each of the plurality of status controllers being connected to a different one of the plurality of searching engines.

7. An apparatus as defined in claim 1, wherein the multi-dimensional search space includes a balanced tree configuration defined by the search space having at least one root node and a plurality of leaf nodes so that each of the plurality of leaf nodes are located on the same level of the tree of the search space.

8. An apparatus as defined in claim 7, wherein the multi-dimensional search space further includes a data structure being defined by a plurality of spherical shapes.

9. An apparatus as defined in claim 8, wherein each of the plurality of spherical shapes comprises a hyper-sphere.

10. An apparatus as defined in claim 1, further comprising an additional biometric searching engine and means for reassigning biometric data groups from each of the plurality of biometric data groups to the additional biometric searching engine for performing a search of biometric data therefrom.

11. An apparatus as defined in claim 10, further comprising parallel searching means for selectively searching the plurality of data groups in parallel for preselected biometric data.

12. An apparatus as defined in claim 11, further comprising biometric record forming means for forming the plurality of biometric records, said biometric record forming means including index assigning means for assigning the at least one biometric index to biometric data independent of the biometric data.

13. An apparatus as defined in claim 12, further comprising biometric record assigning means for hashing additional biometric records to one of the plurality of data groups, and wherein each of the biometric records further includes a plurality of indexes, each of the plurality of indexes being independent of the other ones of the plurality of indexes.

14. An apparatus as defined in claim 13, wherein the plurality of biometric indexes is generally uniformly distributed over the full range of biometric indexes and wherein each of the plurality of biometric data groups is uncorrelated to the biometric indexes.

15. An apparatus as defined in claim 14, wherein the biometric data comprises features of fingerprint data, and wherein the biometric indexes each comprise a numeric value.

16. An apparatus for expandable biometric searching, the apparatus comprising:
    a plurality of biometric data groups for storing the plurality of biometric records, each of the plurality of biometric data groups including at least one biometric record having at least one biometric index and biometric data associated with the at least one biometric index; and a plurality of biometric searching engines, the plurality of biometric searching engines comprising data groups for managing the plurality of data groups, said data group managing means including multi-dimensional search space constructing means for constructing a multi-dimensional search space and internal map constructing means for constructing internal maps for each data group being managed.

17. An apparatus as defined in claim 16, wherein each of said plurality of searching engines further comprises selecting means for selecting from the multi-dimensional search space at least one biometric record and matching means responsive to said selecting means for matching a biometric from the at least one biometric record to a biometric being searched.

18. An apparatus as defined in claim 16, further comprising communications controlling means for controlling communications to and from the plurality of searching engines, transaction scheduling means responsive to said communications controlling means for scheduling priority of searching transactions by the plurality of searching engines, and searching means responsive to said transaction scheduling means for initiating search commands.

19. An apparatus as defined in claim 16, further comprising a plurality of status controllers for controlling the status of the plurality of searching engines, each of the plurality of status controllers being connected to a different one of the plurality of searching engines.

20. An apparatus as defined in claim 19, further comprising an application process controller in communication with each of the plurality of status controllers for controlling at least one selected application process.

21. An apparatus as defined in claim 19, further comprising logging means responsive to one of the plurality of status controllers for logging message data for selected applications.

22. An apparatus as defined in claim 16, wherein the multi-dimensional search space includes a balanced tree configuration defined by the search space having at least one root node and a plurality of leaf nodes so that each of the plurality of leaf nodes are located on the same level of the tree of the search space.

23. An apparatus as defined in claim 16, wherein the multi-dimensional search space includes a data structure being defined by a plurality of spherical shapes.

24. An apparatus as defined in claim 23, wherein each of the plurality of spherical shapes comprises a hyper-sphere.

25. An apparatus as defined in claim 16, further comprising an additional biometric searching engine and means for reassigning biometric data groups from each of the plurality of biometric data groups to the additional biometric searching engine for performing a search of biometric data therefrom.

26. An apparatus as defined in claim 16, further comprising parallel searching means for selectively searching the plurality of data groups in parallel for preselected biometric data.

27. An apparatus as defined in claim 16, further comprising biometric record forming means for forming the plurality of biometric records, said biometric record forming means including index assigning means for assigning the at least one biometric index to biometric data independent of the biometric data.

28. An apparatus as defined in claim 16, further comprising biometric record assigning means for hashing additional biometric records to one of the plurality of data groups, and wherein each of the biometric records further includes a plurality of indexes, each of the plurality of indexes being independent of the other ones of the plurality of indexes.

29. An apparatus as defined in claim 16, wherein the plurality of biometric indexes is generally uniformly distributed over the full range of biometric indexes and wherein each of the plurality of biometric data groups is uncorrelated to the biometric indexes.

30. An apparatus as defined in claim 16, wherein the biometric data comprises features of fingerprint data, and wherein the biometric indexes each comprise a numeric value.

31. An apparatus for expandable biometric searching, the apparatus comprising:

at least one client computer having biometric recording means associated therewith for recording at least one biometric records, the at least one biometric record including at least one biometric index and biometric data associated with the at least one biometric index;

a data communications network connected to the client computer; and at least one server computer connected to the data communications network, the server computer including a database having a plurality of biometric data groups, each of the plurality of biometric data groups including a plurality of biometric records stored therein, each of the biometric records including at least one biometric index and biometric data associated with the at least one biometric index, and a plurality of biometric searching engines, each of the plurality of biometric searching engines comprising data group managing means connected to said plurality of biometric data groups for managing the plurality of data groups, said data group managing means including multi-dimensional search space constructing means for constructing a multi-dimensional search space and internal map constructing means for constructing internal maps for each data group being managed.

32. An apparatus as defined in claim 31, wherein each of said plurality of searching engines further comprises selecting means for selecting from the multi-dimensional search space at least one biometric record and matching means responsive to said selecting means for matching a biometric from the at least one biometric record to a biometric being searched.

33. An apparatus as defined in claim 32, further comprising communications controlling means for controlling communications to and from the plurality of searching engines, transaction scheduling means responsive to said communications controlling means for scheduling priority of searching transactions by the plurality of searching engines, and searching means responsive to said transaction scheduling means for initiating search commands.

34. An apparatus as defined in claim 33, further comprising a plurality of status controllers for controlling the status of the plurality of searching engines, each of the plurality of status controllers being connected to a different one of the plurality of searching engines.

35. An apparatus as defined in claim 34, further comprising an application process controller in communication with each of the plurality of status controllers for controlling at least one selected application process.

36. An apparatus as defined in claim 35, further comprising logging means responsive to one of the plurality of status controllers for logging message data for selected applications.

37. An apparatus as defined in claim 36, wherein the multi-dimensional search space includes a balanced tree configuration defined by the search space having at least one root node and a plurality of leaf nodes so that each of the plurality of leaf nodes are located on the same level of the tree of the search space.

38. An apparatus as defined in claim 37, wherein the multi-dimensional search space further includes a data structure being defined by a plurality of spherical shapes.

39. An apparatus as defined in claim 38, wherein each of the plurality of spherical shapes comprises a hyper-sphere.

40. An apparatus as defined in claim 39, further comprising an additional biometric searching engine and means for reassigning biometric data groups from each of the plurality of biometric data groups to the additional biometric searching engine for performing a search of biometric data therefrom.

41. An apparatus as defined in claim 40, further comprising parallel searching means for selectively searching the plurality of data groups in parallel for preselected biometric data.

42. An apparatus as defined in claim 41, further comprising biometric record forming means for forming the plurality of biometric records, said biometric record forming means including index assigning means for assigning the at least one biometric index to biometric data independent of the biometric data.

43. An apparatus as defined in claim 42, further comprising biometric record assigning means for hashing additional biometric records to one of the plurality of data groups, and wherein each of the biometric records further includes a plurality of indexes, each of the plurality of indexes being independent of the other ones of the plurality of indexes.

44. An apparatus as defined in claim 43, wherein the plurality of biometric indexes is generally uniformly distributed over the full range of biometric indexes and wherein each of the plurality of biometric data groups is uncorrelated to the biometric indexes.

45. An apparatus as defined in claim 44, wherein the biometric data comprises features of fingerprint data, and wherein the biometric indexes each comprise a numeric value.

46. A method of expandably storing and searching biometric data, the method comprising the steps of:
providing a plurality of biometric data groups, each of the plurality of biometric data groups having a plurality of biometric records stored therein, each of the plurality of biometric records including at least one biometric index and biometric data associated with the at least one biometric index;
assigning each of the plurality of data groups to a plurality of biometric searching engines for performing a search of biometric data from the plurality of separate biometric data groups so that each of the plurality of biometric data groups is assigned only one of the plurality of biometric searching engines; and
controlling the plurality of data groups so as to construct a multi-dimensional search space and to construct internal maps for each data group being controlled.

47. A method as defined in claim 46, further comprising selecting from the multi-dimensional search space at least one biometric record and matching a biometric from the at least one biometric record to a biometric being searched.

48. A method as defined in claim 46, further comprising controlling communications to and from the multi-dimensional search space so as to search therefrom, scheduling priority of searching transactions from the multi-dimensional search space, and searching the multi-dimensional search space.

49. A method as defined in claim 48, further comprising controlling the status of the searching transactions from the multi-dimensional search space.

50. A method as defined in claim 49, further comprising controlling at least one selected application process responsive to the search transaction status and logging message data for selected applications.

51. A method as defined in claim 46, wherein the multi-dimensional search space includes a balanced tree configuration defined by the search space having at least one root node and a plurality of leaf nodes so that each of the plurality of leaf nodes are located on the same level of the tree of the search space.

52. A method as defined in claim 51, wherein the multi-dimensional search space further includes a data structure being defined by a plurality of spherical shapes.

53. A method as defined in claim 52, wherein each of the plurality of spherical shapes comprises a hyper-sphere.

54. A method as defined in claim 46, further comprising the step of searching each of the plurality of data groups in parallel for preselected biometric data.

55. A method as defined in claim 46, further comprising the step of assigning the at least one biometric index to biometric data independent of the biometric data.

56. A method as defined in claim 46, further comprising the step of hashing an additional biometric record to one of the plurality of separate database addresses.

57. A method as defined in claim 46, wherein each of the biometric records further includes a plurality of indexes, each of the plurality of indexes being independent of the other ones of the plurality of indexes.

58. A method as defined in claim 46, wherein the providing step includes uniformly distributing the plurality of biometric indexes over the predetermined full range of biometric indexes in each of the plurality of data groups.

59. A method as defined in claim 46, wherein the biometric data comprises features of fingerprint data, and wherein the biometric indexes each comprise a numeric value.

60. A method as defined in claim 46, wherein each of the plurality of biometric data groups is uncorrelated to the biometric indexes.

61. A method as defined in claim 60, further comprising searching for biometric data which matches at least one preselected biometric characteristic.

62. A method for expandably storing and searching biometric data, the method comprising the step of:
assigning a plurality of biometric records to each of the plurality of biometric data groups, each of the plurality of biometric records including at least one biometric index and biometric data associated with the at least one biometric index;
assigning each of plurality of data groups to a plurality of biometric searching engines for performing a search of biometric data from the plurality of biometric data groups so that each of the plurality of biometric data groups is assigned only one of the plurality of biometric searching engines; and
controlling the plurality of data groups so as to construct the multi-dimensional search space and to construct internal maps for each data group being controlled.

63. A method as defined in claim 62, further comprising selecting from the multi-dimensional search space at least one biometric record and matching a biometric from the at least one biometric record to a biometric being searched.

64. A method as defined in claim 63, further comprising controlling communications to and from the multi-dimensional search space so as to search therefrom, scheduling priority of searching transactions from the multi-dimensional search space, and searching the multi-dimensional search space.

65. A method as defined in claim 64, further comprising controlling the status of the searching transactions from the multi-dimensional search space.

66. A method as defined in claim 65, further comprising controlling at least one selected application process responsive to the search transaction status and logging message data for selected applications.

67. A method as defined in claim 63, wherein the biometric data comprises features of fingerprint data, and wherein the biometric indexes each comprise a numeric value.

68. A method as defined in claim 67, wherein each of the plurality of biometric data groups is uncorrelated to the biometric indexes.

69. A method as defined in claim 68, further comprising searching for biometric data which matches at least one preselected biometric characteristic.

70. A method as defined in claim 62, wherein the multi-dimensional search space includes a balanced tree configuration defined by the search space having at least one root node and a plurality of leaf nodes so that each of the plurality of leaf nodes are located on the same level of the tree of the search space.

71. A method as defined in claim 70, wherein the multi-dimensional search space further includes a data structure being defined by a plurality of spherical shapes.

72. A method as defined in claim 71, wherein each of the plurality of spherical shapes comprises a hyper-sphere.

73. A method as defined in claim 72, further comprising the step of selectively searching the plurality of data groups in parallel for biometric data.

74. A method as defined in claim 62, further comprising the step of assigning the at least one biometric index to biometric data independent of the biometric data.

75. A method as defined in claim 74, further comprising the step of hashing an additional biometric record to one of the plurality of data groups.

76. A method as defined in claim 75, wherein each of the biometric records further includes a plurality of indexes, each of the plurality of indexes being independent of the other ones of the plurality of indexes.

77. A method as defined in claim 76, wherein the providing step includes uniformly distributing the plurality of biometric indexes over the predetermined full range of biometric indexes in each of the plurality of data groups.

* * * * *

UNITED STATES PATENT AND TRADEMARK OFFICE
CERTIFICATE OF CORRECTION

PATENT NO. : 6,047,282  
DATED : April 4, 2000  
INVENTOR(S) : Wilson et al.

Figure 5A:
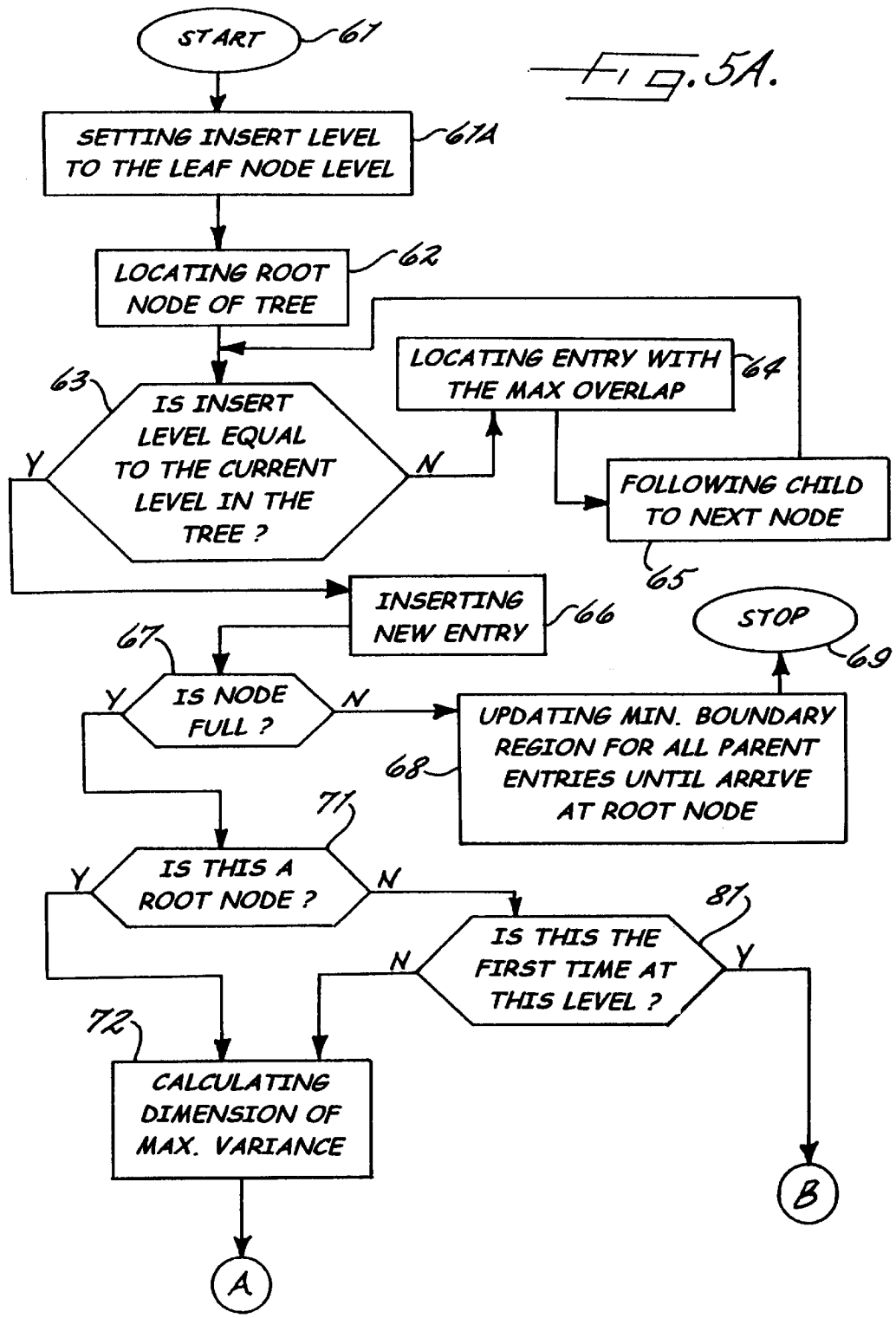
FIG. 5 is a schematic flow diagram of a method of inserting additional biometric data into an apparatus for expandable biometric searching according to the present invention.
Figure 5B:
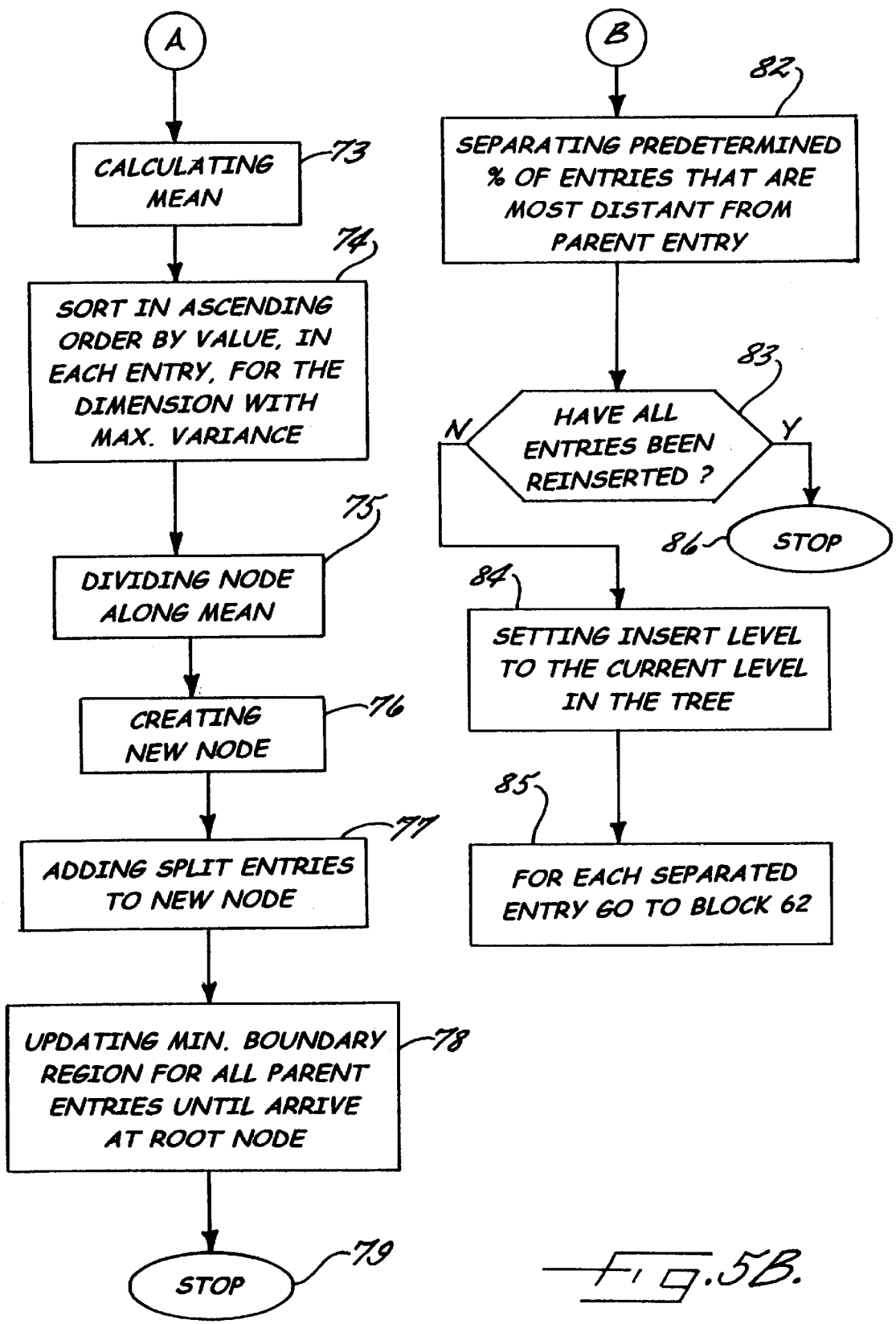

It is certified that error appears in the above-identified patent and that said Letters Patent is hereby corrected as shown below:

Column 4,  
Line 52, delete "FIG. 5 is a schematic flow diagram" insert -- FIGS. 5A-5B are schematic flow diagrams -- therefor.

Column 9,  
Line 43, delete "FIG. 5 advantageously illustrates" insert -- FIGS. 5A-5B advantageously illustrate -- therefor.

Signed and Sealed this

Thirtieth Day of October, 2001

Attest:

NICHOLAS P. GODICI  
*Attesting Officer*     *Acting Director of the United States Patent and Trademark Office*